US010286984B2

(12) United States Patent
Seravalli et al.

(10) Patent No.: US 10,286,984 B2
(45) Date of Patent: May 14, 2019

(54) FLOATING ELEMENT FOR REALIZING FLOATING STRUCTURES FOR SUPPORTING PHOTOVOLTAIC PANELS AND METHOD FOR PRODUCING SAID FLOATING ELEMENT

(71) Applicant: NRG ENERGIA S.r.l., Imola (IT)

(72) Inventors: Loris Seravalli, Imola (IT); Simone Pausini, Imola (IT)

(73) Assignee: NRG ENERGIA S.R.L., Imola (BO) (IT)

( * ) Notice: Subject to any disclaimer, the term of this patent is extended or adjusted under 35 U.S.C. 154(b) by 0 days.

(21) Appl. No.: 15/751,331

(22) PCT Filed: Aug. 12, 2016

(86) PCT No.: PCT/IB2016/054863
§ 371 (c)(1),
(2) Date: Feb. 8, 2018

(87) PCT Pub. No.: WO2017/025932
PCT Pub. Date: Feb. 16, 2017

(65) Prior Publication Data
US 2018/0237111 A1 Aug. 23, 2018

(30) Foreign Application Priority Data
Aug. 12, 2015 (IT) .................. 102015000044101

(51) Int. Cl.
*B63B 35/34* (2006.01)
*B63B 35/44* (2006.01)
(Continued)

(52) U.S. Cl.
CPC .............. *B63B 35/34* (2013.01); *B63B 3/142* (2013.01); *B63B 35/44* (2013.01); *F24S 20/70* (2018.05);
(Continued)

(58) Field of Classification Search
CPC .. B63B 3/00; B63B 3/08; B63B 35/00; B63B 35/34; B63B 35/38; B63B 35/44; B63C 1/00; B63C 1/02
(Continued)

(56) References Cited

U.S. PATENT DOCUMENTS

| 3,073,271 A | 1/1963 | Brill |
| 4,799,445 A | 1/1989 | Weriwether |

(Continued)

FOREIGN PATENT DOCUMENTS

| EP | 0138574 A2 | 4/1985 |
| EP | 2138393 A1 | 12/2009 |

(Continued)

OTHER PUBLICATIONS

Database WPI, Section CH, Week 201479, Thomson Scientific, Class A85, AN 2013-V67952, XP002756457.

*Primary Examiner* — Lars A Olson
(74) *Attorney, Agent, or Firm* — R. Neil Sudol; Henry D. Coleman

(57) ABSTRACT

Floating element (1) for realizing floating structures for supporting photovoltaic panels and method for producing said floating element (1). The floating element (1) comprises: a first element (2) which can be obtained by injection moulding, which configures a first coupling portion (3); a second element (4) which can be obtained by injection moulding, which configures a second coupling portion (5). The first element (2) and the second element (4) are mutually configured so that the first coupling portion (3) and the second coupling portion (5) can be seal-coupled with respect to each other so that they define a sealed chamber, when coupled.

14 Claims, 7 Drawing Sheets

(51) Int. Cl.
*B63B 3/14* (2006.01)
*F24S 20/70* (2018.01)
*F24S 80/00* (2018.01)
*F24S 25/60* (2018.01)

(52) U.S. Cl.
CPC . *B63B 2035/4453* (2013.01); *F24S 2025/601* (2018.05); *F24S 2025/6007* (2018.05); *F24S 2080/015* (2018.05); *Y02E 10/47* (2013.01)

(58) Field of Classification Search
USPC .......................................... 114/264, 266, 267
See application file for complete search history.

(56) References Cited

U.S. PATENT DOCUMENTS

| | | | | |
|---|---|---|---|---|
| 5,529,013 | A * | 6/1996 | Eva, III | B63B 35/38 114/266 |
| 5,931,113 | A * | 8/1999 | Eva, III | B63B 35/38 114/266 |
| 6,033,151 | A * | 3/2000 | Tsou | B63B 35/38 114/266 |
| 6,035,797 | A * | 3/2000 | Robinson | B63B 35/34 114/267 |
| 7,426,898 | B1 * | 9/2008 | Ahern | B63C 1/02 114/267 |
| 8,783,199 | B2 * | 7/2014 | Shih Cion Shen | B63B 35/38 114/266 |
| 2011/0155037 | A1 | 6/2011 | Moody | |
| 2012/0090667 | A1 | 4/2012 | Cap et al. | |

FOREIGN PATENT DOCUMENTS

| | | |
|---|---|---|
| FR | 1436779 A | 4/1966 |
| FR | 2980562 A1 | 3/2013 |
| JP | 2002/173083 A | 6/2002 |
| JP | 2004/063497 A | 2/2004 |
| JP | 2013/239684 A | 11/2013 |
| WO | WO 2013/113307 A2 | 8/2013 |
| WO | WO 2015/092237 A1 | 6/2015 |

* cited by examiner

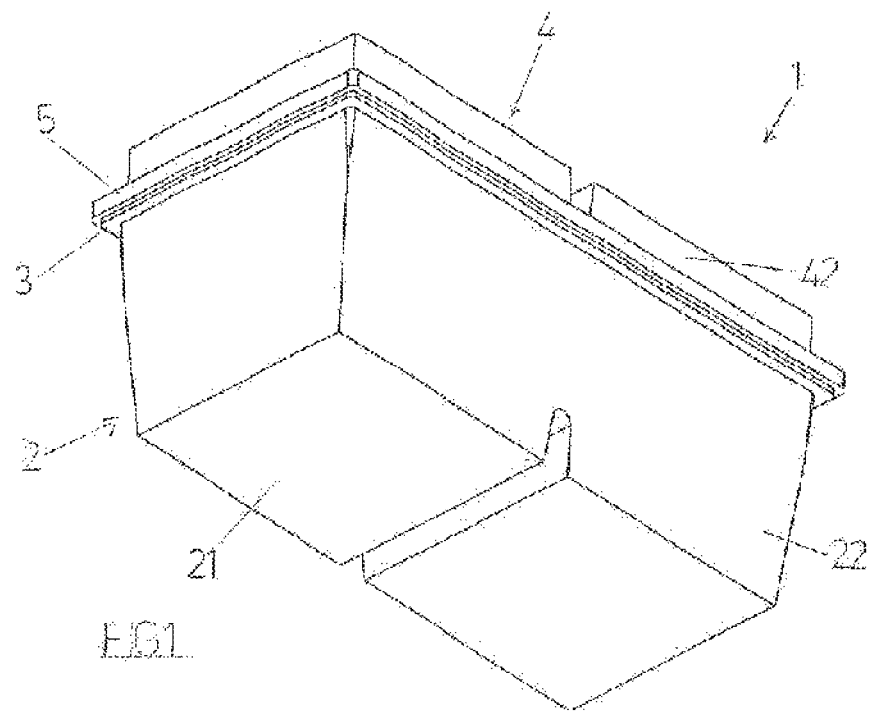
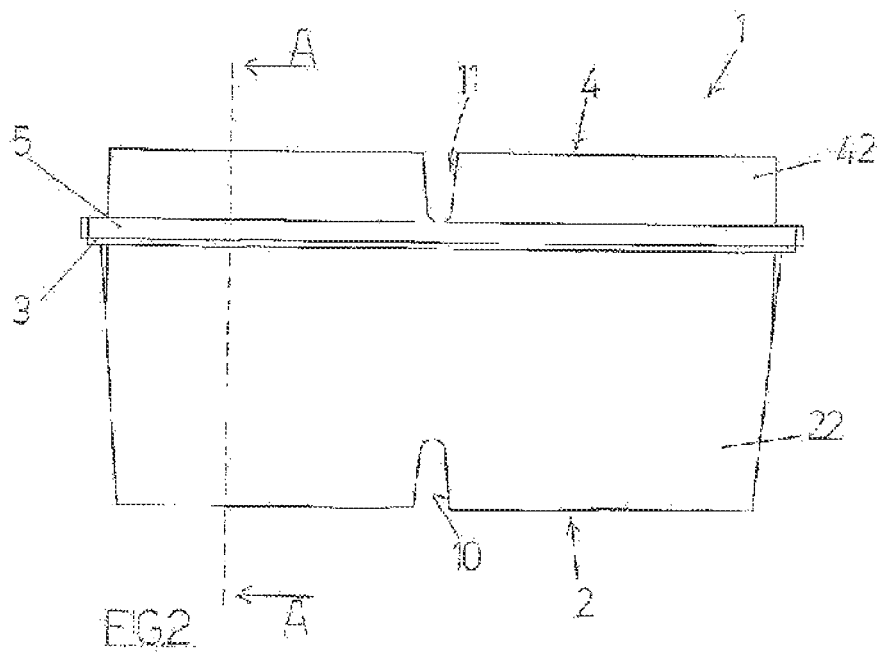

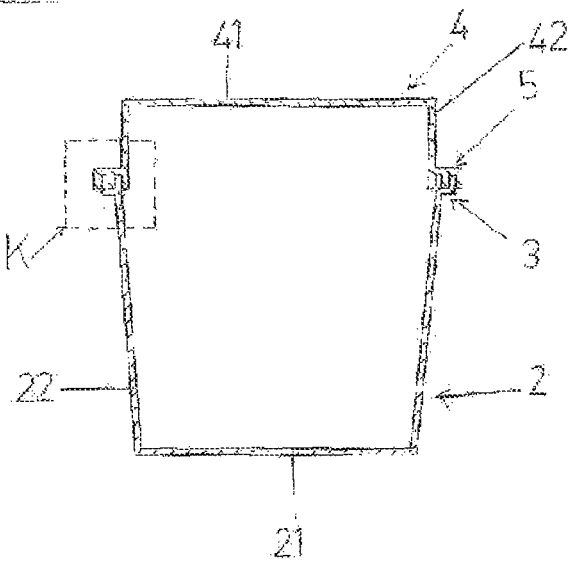
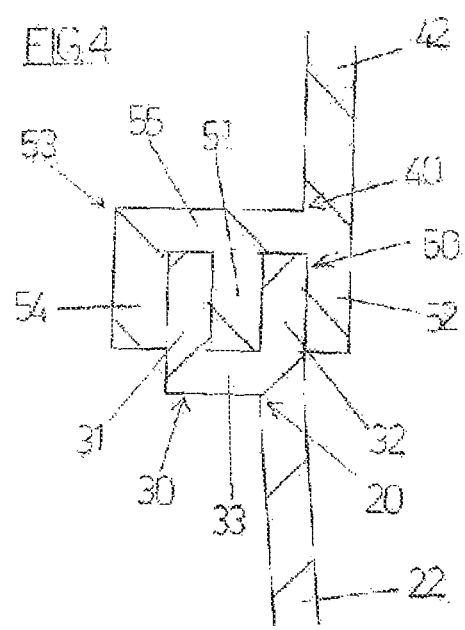

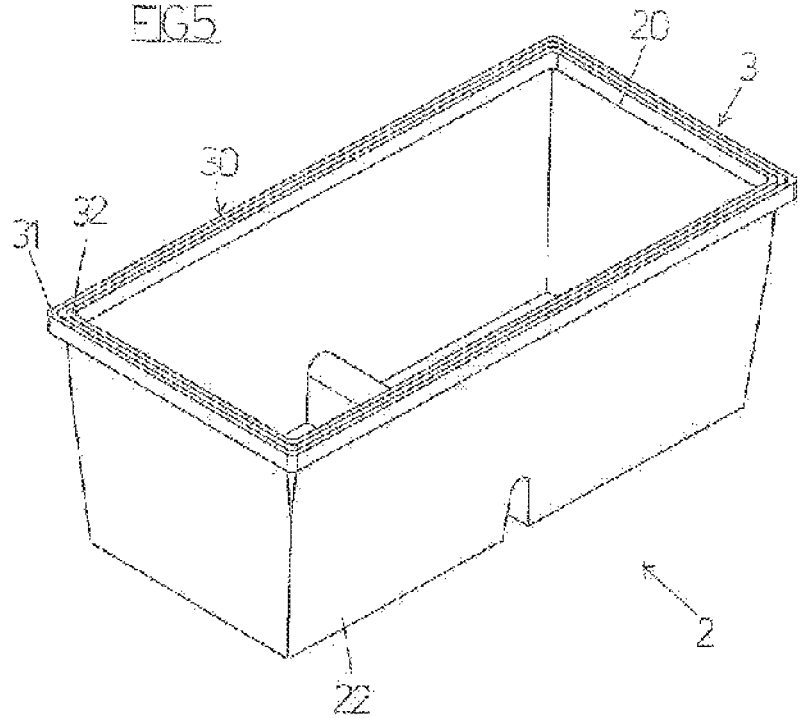
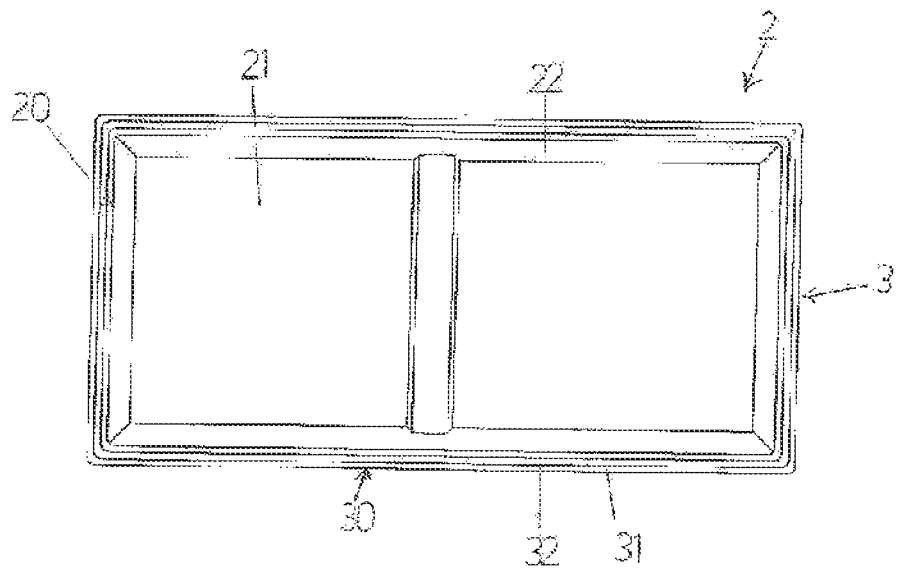

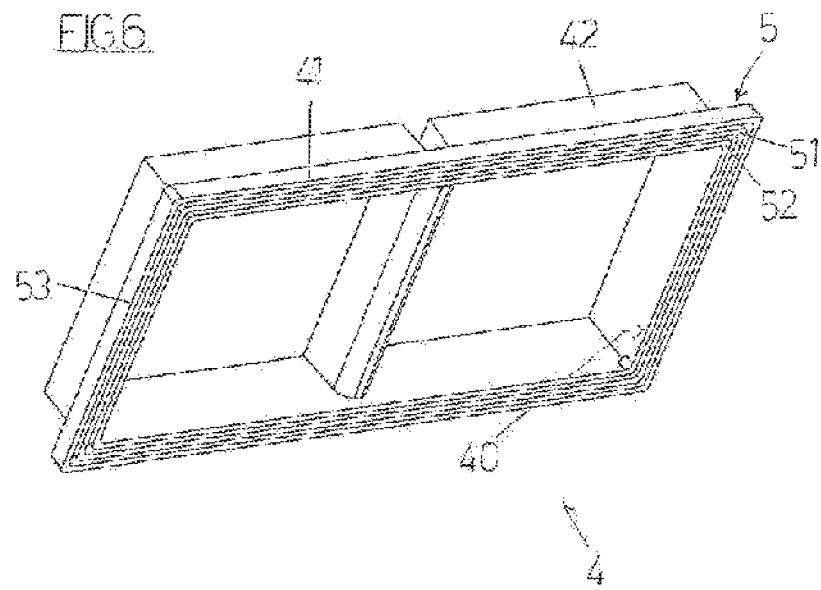
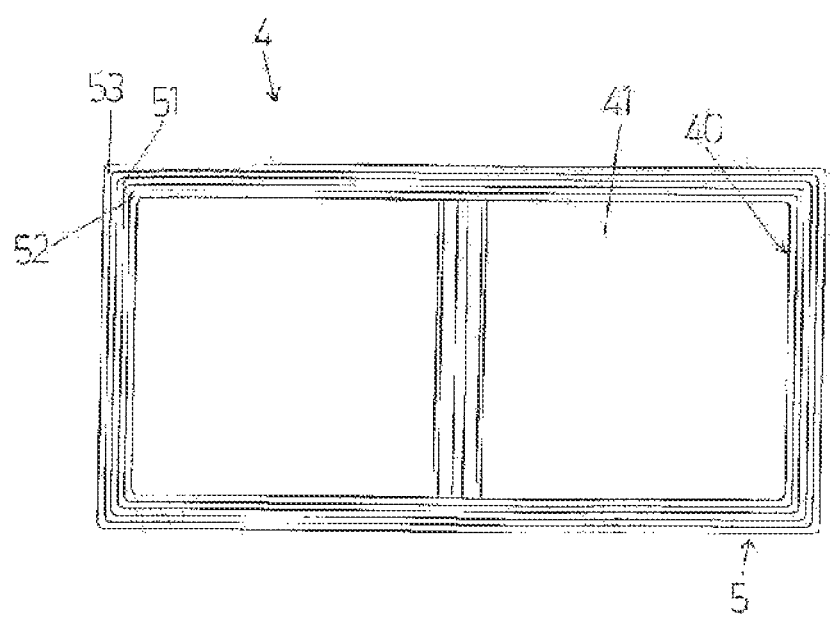

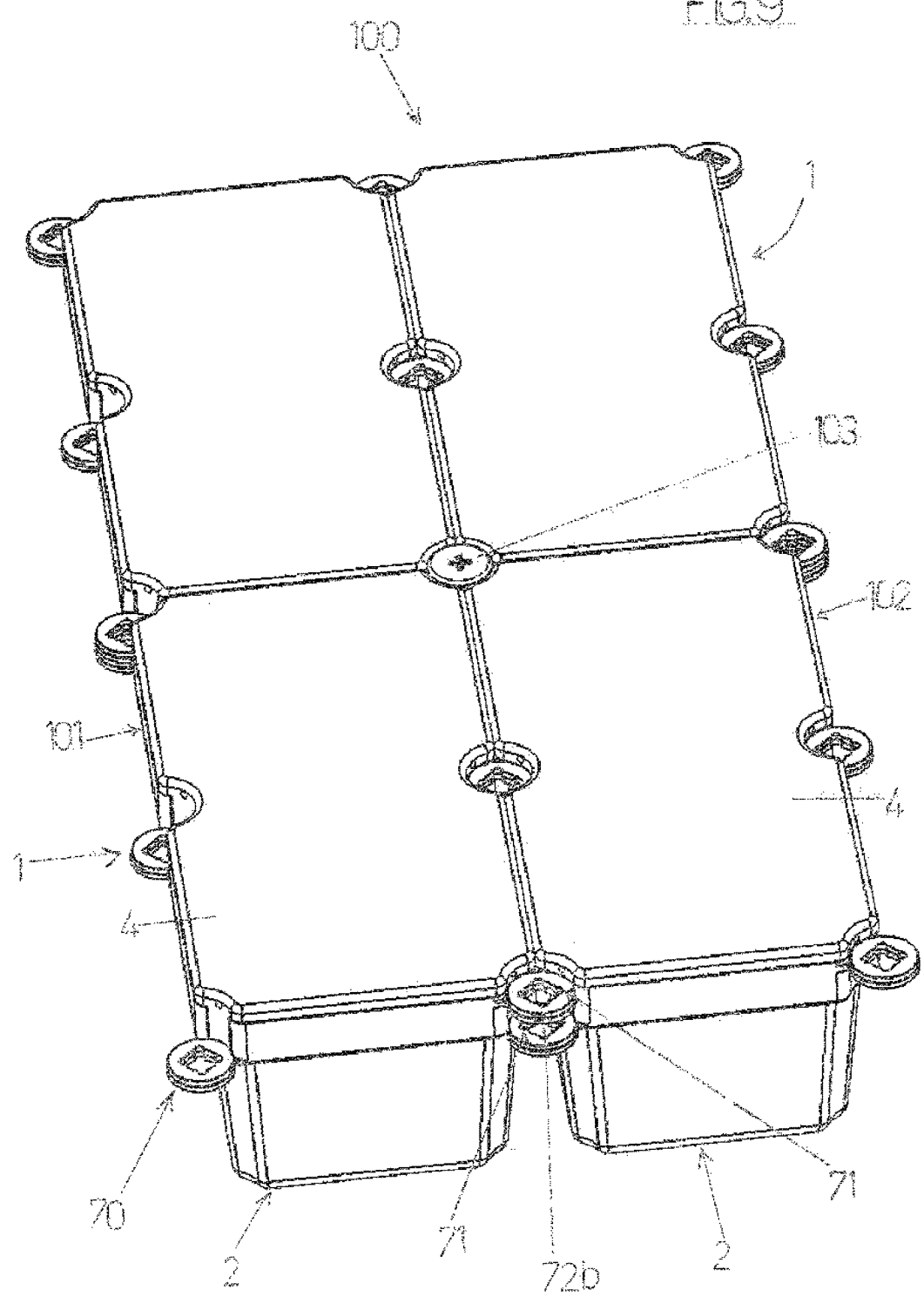

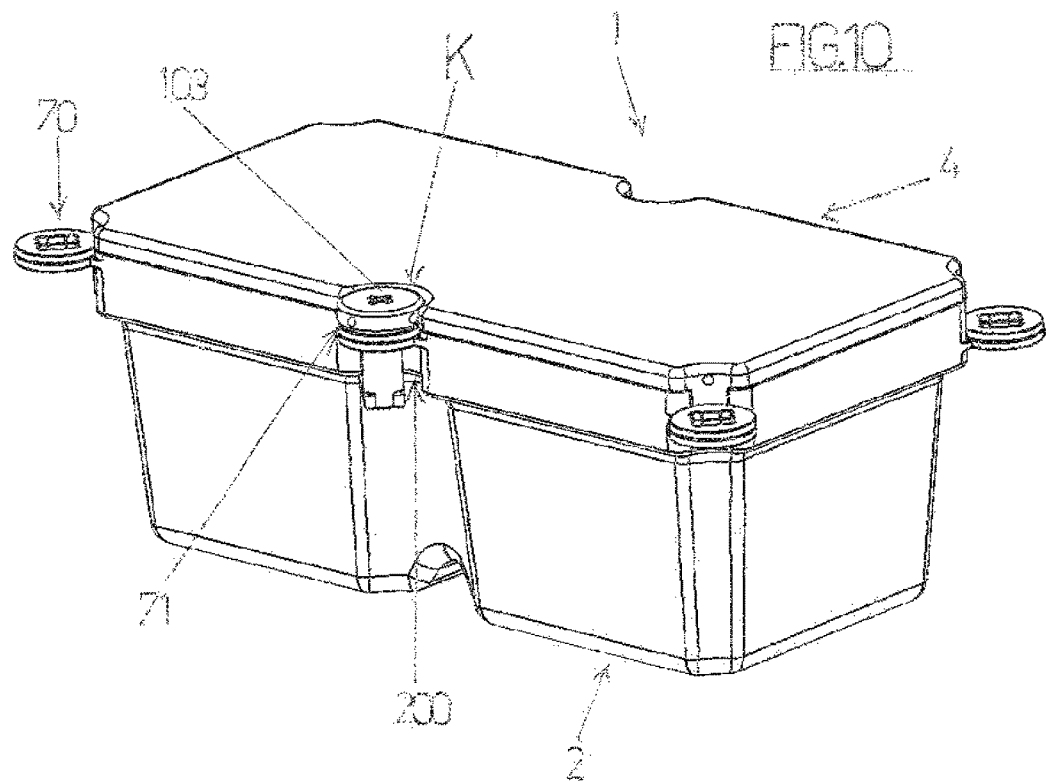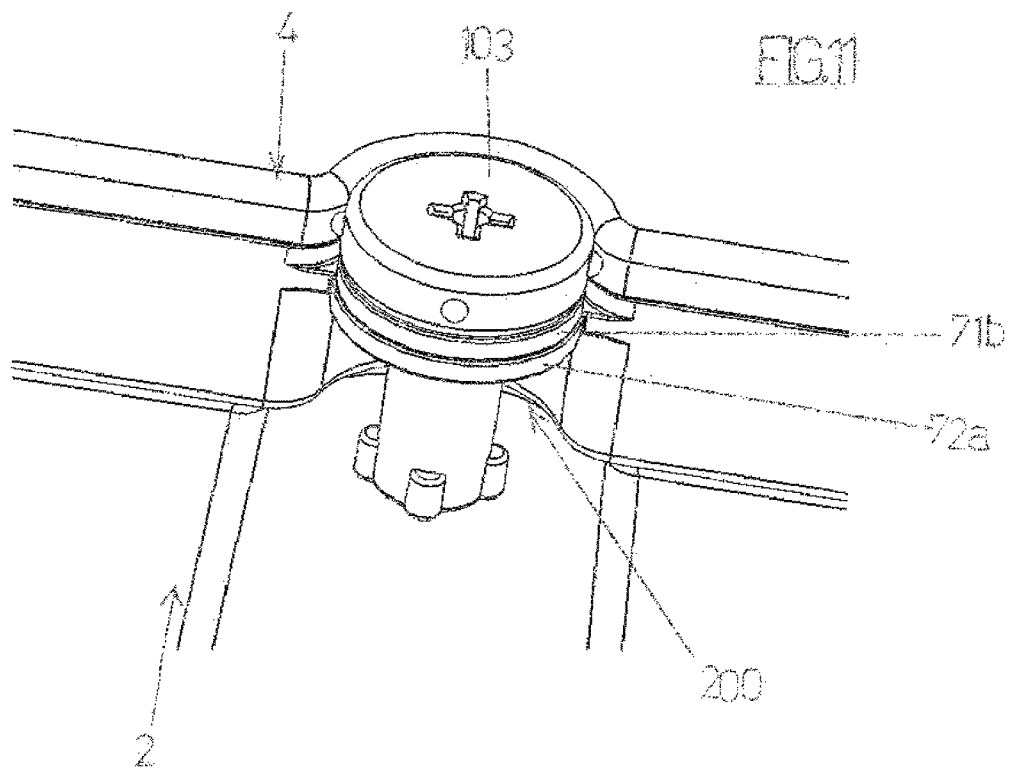

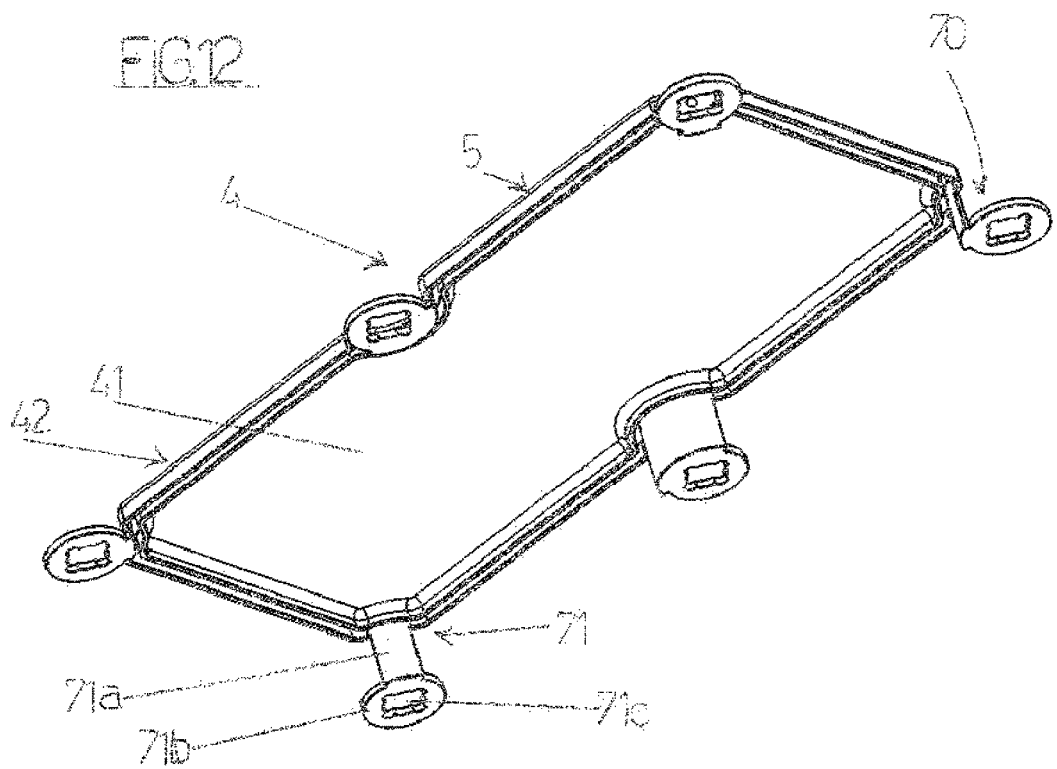
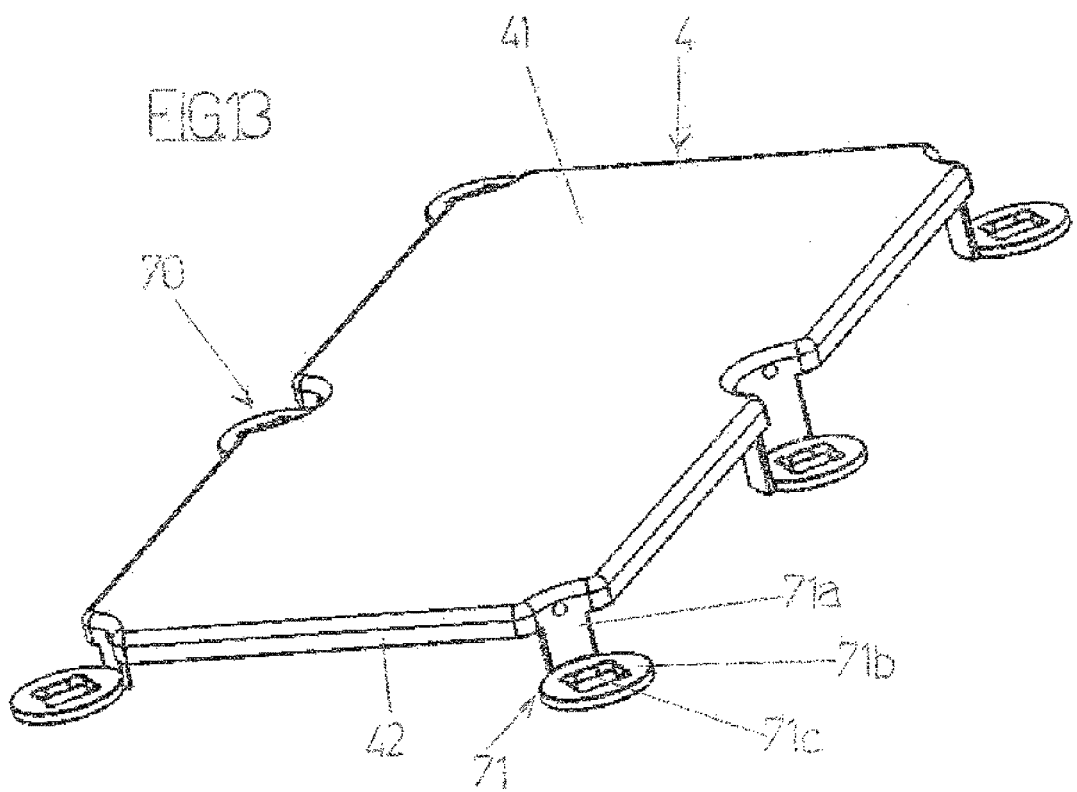

FLOATING ELEMENT FOR REALIZING FLOATING STRUCTURES FOR SUPPORTING PHOTOVOLTAIC PANELS AND METHOD FOR PRODUCING SAID FLOATING ELEMENT

FIELD OF THE INVENTION

The present invention relates to the technical field concerning the realization of floating structures for supporting photovoltaic panels. In particular, the present invention relates to a floating element for realizing floating structures for supporting photovoltaic panels and to a method for producing said floating element.

More in detail, the proposed floating element is apt to realize both floating structures for supporting photovoltaic panels and floating wharves.

DESCRIPTION OF PRIOR ART

It is known that many floating elements connected to each other and a plurality of metal rods are used for realizing a floating structure for supporting photovoltaic panels.

A floating element of known kind is realized in plastic material, as a unique body and is shaped as a cube or a parallelepiped.

Such known floating element is realized by means of blow moulding.

Such technique provides a suitable mould provided with a hole for air injection and which can be closed such that, when closed, configures a space therein shaped as the desired floating element.

In particular, such technique provides the following steps: providing a hollow cylinder of a plastic material; closing the mould around the hollow cylinder of plastic material; injecting air under pressure inside the mould by means of the hole for injection of the mould, so that the plastic material adheres to the walls of the mould so that it gets the shape of the space and remains hollow inside.

In the following, the mould is opened and the floating element is extracted, which has a hole at the point where the injection of the air under pressure occurred, which is going to be closed by means of a respective plug.

Such technique is expensive and consequently this affects the costs of the floating element.

Moreover, since it is a unique body, the thus obtained floating element is cumbersome. As a consequence, also transport affects the costs of the floating element, above all considering that a plurality of floating elements is needed to realize a floating structure.

This causes another increase in the costs of each floating element.

SUMMARY OF THE INVENTION

Therefore, aim of the present invention is to overcome said drawbacks.

In particular, aim of the present invention is to reduce the transport costs and the production costs of the floating element.

Said aims are obtained by means of a floating element for realizing floating structures for supporting photovoltaic panels according to claim 1, a respective floating structure according to claim 9 and a method of production of said floating element according to claim 10.

The proposed floating element, thanks to fact that it comprises a first element and a second element which can be seal-coupled together, can be transported with said first and second element decoupled and can be assembled near or at the area of use of the floating element.

During the transport, this allows to arrange the first and the second element with respect to each other such that they take less volume than the volume taken by the assembled floating element (for example the first element of a floating element can be stacked or inserted partially inside a first element of another floating element).

Advantageously, the transport costs of the floating element are reduced.

Moreover, thanks to the fact that the proposed floating element is not a unique body but it comprises a first element and the second element which can be seal-coupled together, it is possible to realize the first element and the second element by means of the injection moulding technique.

Injection moulding is more diffused than the blow moulding and as a consequence it has lower costs. Advantageously this allows to reduce the production costs of the floating element as well.

BRIEF DESCRIPTION OF THE DRAWINGS

Specific embodiments of the invention will be described in the following according to the claims and with reference to the appended drawings, in which:

FIGS. 1 and 2 show a perspective and side view respectively of the floating element object of the present invention:

FIG. 3 shows a section view of the floating element along section A-A of FIG. 2;

FIG. 4 shows an enlarged view of the detail K of FIG. 3;

FIGS. 5 and 6 show a perspective view of the first and second element respectively of the floating element of FIG. 1;

FIG. 7 shows a top view of FIG. 5;

FIG. 8 shows a bottom view of FIG. 6;

FIG. 9 shows a perspective view of a floating element object of the present invention;

FIG. 10 shows a perspective view of a preferred embodiment of the floating element object of the present invention;

FIG. 11 shows an enlarged view of the detail K of FIG. 10;

FIGS. 12 and 13 show perspective views respectively of the second element (4) of the floating element of FIG. 10.

DESCRIPTION OF PREFERRED EMBODIMENTS

With reference to the appended drawings, with (1) it is generally indicated a floating element for realizing floating elements for supporting photovoltaic panels, which is object of the present invention.

It is to be precised that the proposed floating element (1) can be used for example to realize floating wharves as well.

With reference to the appended drawings, the floating element (1) comprises a first element (2) which can be obtained by injection moulding, which configures a first coupling portion (3), and a second element (4) which can be obtained by injection moulding, which configures a second coupling portion (5).

The first element (2) and the second element (4) are mutually configured so that the first coupling portion (3) and the second coupling portion (5) can be seal-coupled with respect to each other so that they define a sealed chamber, when coupled (FIGS. 1 and 2).

Moreover, the floating element (1) comprises connection means (70) for connecting it to another floating element (1).

The connection means (70) comprise: a first connection element (71) integral to the second element (4), the first connection element (71) comprising a first portion (71a) developing from the second element (4) and a first tongue (71b) developing from the first portion (71a) and which comprises a first through hole (71c); a second connection means (72) integral to the first element (2), the second connection element (72) comprising a second tongue (72a) developing from the first element (2) and which comprises a second through hole (72b); the first tongue (71b) and the second tongue (72a) being mutually arranged so that, when the first element (2) and the second element (4) are coupled, the first through hole (71c) is opposed to the second through hole (72b).

Moreover, the first element (2) comprises a first groove (200) which is shaped complementarily to the first portion (71a) of the first connection element (71) and which is arranged so that, when the first element (2) and the second element (4) are coupled, the first groove (200) receives the first portion (71a) and they result in form-coupling.

Therefore, thanks to their particular shape, in particular thanks to the first groove (200) and the first portion (71a) of the first connection means (71), the connection means (70) allow: to connect the floating element (1) to another floating element (1) and while guaranteeing an optimal coupling between the first portion (2) and the second portion (4).

This is particularly important and advantageous in case such floating element (1) is used in open sea.

Preferably, the second element (4) comprises a second bottom wall (41) and a second side wall (42) which rises from the second bottom wall (41) and in which the first portion (71a) of the first connection element (71) develops transversely (for example perpendicularly) with respect to the second bottom wall (41).

The first tongue (71b) can be transverse to the first portion (71a). The first tongue (71b) can be parallel to the second bottom wall (41).

Preferably, the first connection element (71) is a unique body with the second element (4) and the second connection element (72) is a unique body with the first element (2). Advantageously, the connection means (70), the first element (2) and the second element (4) can be realized by injection moulding.

It is understood that the connection means (70) can comprise a plurality of first connection elements (71) and a plurality of second connection elements (72) (see FIG. 10). In this way, each floating element (1) can be connected to at least two floating elements (1) more.

Preferably, the floating element (1) is such that: the first coupling portion (3) is arranged at a first peripheral edge (20) of the first element (2) and comprises a first housing (30) comprising in turn a first wall (31) and a second wall (32) opposed with respect to each other; the second coupling portion (5) is arranged at a second peripheral edge (40) of the second element (4) and comprises a third wall (51). The first housing (30) and the third wall (51) are mutually configured so that the first housing (30) can receive the third wall (51) at least partially (FIGS. 3 and 4).

The first coupling portion (3) can be annular.

The second coupling portion (5) can be annular.

With reference to FIG. 4, the first housing (30) can be shaped as U. In particular, the first housing (30) can comprise a bottom wall (33) which connects the first wall (31) and the second wall (32).

Preferably, the first housing (30) and the third wall (51) are mutually configured so that the first housing (30) can receive the third wall (51) as a whole.

Preferably, the second coupling portion (5) comprises a second housing (50) comprising in turn the third wall (51) and a fourth wall (52) opposed to the third wall (51). The second wall (32) and the second housing (50) are mutually configured so that the second housing (50) can receive the second wall (32) at least partially.

Advantageously, the coupling between the first element (2) and the second element (4) is safer from the sealing point of view.

With reference to FIG. 4, the second housing (50) can be shaped as U. In particular, the second housing (50) can comprise a bottom wall (55) which connects the third wall (51) and the fourth wall (52).

Preferably, the second housing (50) and the second wall (32) are mutually configured so that the second housing (50) can receive the second wall (32) as a whole.

Preferably, the second coupling portion (5) comprises a third housing (53) comprising in turn the third wall (51) and a fifth wall (54) opposed to the third wall (51). The first wall (31) and the third housing (53) are mutually configured so that the third housing (53) can receive the first wall (31) at least partially.

Advantageously, the coupling between the first element (2) and the second element (4) is safer from the sealing point of view.

With reference to FIG. 4, the third housing (53) can be shaped as U. In particular, the third housing (53) can comprise a bottom wall (55) which connects the third wall (51) and the fifth wall (52).

Such bottom wall (55) of the third housing (53) can be a unique body with the bottom wall (5) of the second housing (50) (FIG. 4).

Preferably, the first wall (31) and the third housing (53) are mutually configured so that the third housing (53) can receive the first wall (31) as a whole.

According to the embodiment shown in the figures, the first coupling portion (3) can be configured as U and the second coupling portion (5) can be configured as M.

The first element (2) and the second element (4) can be mutually configured so that the first coupling portion (3) and the second coupling portion (5) can be restraint-coupled to each other.

Possibly, the floating element (1) can comprise glue to stabilize further the sealing coupling of the first coupling portion (3) and the second coupling portion (5).

Preferably, the first element (2) comprises a first bottom wall (21) and a first side wall (22) raising from the first bottom wall (21) and which comprises the first coupling portion (3). The first side wall (22) is countersunk to define an angle greater than 90° with the first bottom wall (21) so that it is possible to stack the same first element (2) with a first element (2) of another floating element (1) according to any one of the preceding claims (FIGS. 5 and 7).

Advantageously, during the transport of many not assembled floating elements (1) it is possible to reduce the space taken by the first elements (2) of said floating elements (1) by stacking them.

Preferably, the second element (4) comprises a second bottom wall (41) and a second side wall (42) raising from the second bottom wall (41) and which comprises the second coupling portion (5) (FIGS. 6 and 8). The second side wall (42) is countersunk to define an angle greater than 90° with the second bottom wall (41) so that it is possible to stack the same second element (4) with a second element (4) of another floating element (1) according to any one of the preceding claims.

Advantageously, during the transport of many not assembled floating elements (1) it is possible to reduce the space taken by the second elements (4) of said floating elements (1) by stacking them.

According to the embodiment of the floating element (1) shown in the figures, the first element (2) can be configured as a container and the second element (4) can be configured as a cover.

As an alternative, the second element (4) can be configured as a container as well.

In particular, in case the first element (2) and the second element (4) are equal, during the transport of many not assembled floating elements (1) it is possible to reduce the space taken by said floating elements (1) by stacking the first elements (2) and the second elements (4) of said floating elements (1) by stacking them.

Preferably, when the first element (2) and the second element (4) are coupled to each other, the floating element (1) configures a cube or a parallelepiped.

With particular reference to FIG. 2, the first element (2) can comprise a groove (10) (for example shaped as U) configured in the bottom wall (21). Likewise, the second element (4) can comprise a groove (11) as well (for example configured as U) configured in the respective bottom wall (41). Such grooves (10, 11) are useful to connect more floating elements (1) between to each other to realize a floating structure for supporting photovoltaic panels; in particular, such grooves (10, 11) configure housings for the rods used for realizing a floating structure for supporting photovoltaic panels.

Yet, object of the present invention is a floating structure (100) for supporting photovoltaic panels. With reference to FIG. 9, it comprises a first floating element (101) according to one of said embodiments, and a second floating element (102) according to one of said embodiments.

In particular, the first floating element (101) and the second floating element (102) are mutually arranged so that the first through hole (71c) and the second through hole (72b) of the first floating element (101) are opposed to the first through hole (71c) and the second through hole (72b) of the second floating element (102).

Moreover, the floating structure (100) comprises a fixing element (103) which is configured to cross the first through hole (71c) of the first floating element (101), the second through hole (72b) of the first floating element (101), the first through hole (71c) of the second floating element (102) and the second through hole (72b) of the second floating element (102) and to fix the first floating element (101) and the second floating element (102) with respect to each other.

Preferably, the fixing element (103) is configured as a unique body and so that its coupling with the first floating element (101) and the second floating element (102) is allowed smoothly.

Yet, object of the present invention is the method for producing a floating element (1) according to some of said embodiments.

Such method comprises the steps of: producing by means of injection moulding the first element (2) which configures the first coupling portion (3) and the second connection element (72); producing by means of injection moulding the second element (4) which configures the second coupling portion (5) and the first connection element (71).

Moreover, the method comprises the step of coupling the first element (2) and the second element (4) together so that: the first coupling portion (3) and the second coupling portion (5) can be seal-coupled and the sealed chamber is formed; the first through hole (71c) of the first tongue (71b) is opposed to the second through hole (72b) of the second tongue (72a); the first groove (200) of the first element (2) receives the first portion (71a).

In case the first coupling portion (3) is arranged at a first peripheral edge (20) of the first element (2) and comprises a first housing (30) comprising in turn a first wall (31) and a second wall (32) opposed with respect to each other and the second coupling portion (5) is arranged at a second peripheral edge (40) of the second element (4) and comprises a third wall (51), the step of coupling the first element (2) and the second element (4) with respect to each other comprises the steps of injecting glue in the first housing (30) and of introducing the third wall (51) in the first housing (30) at least partially.

Advantageously, the coupling is simple and efficient.

In case the second coupling portion (5) comprises a second housing (50) comprising in turn the third wall (51) and a fourth wall (52) opposed to the third wall (51), the step of coupling the first element (2) and the second element (4) with respect to each other comprises the steps of injecting glue in the second housing (50) and of introducing the second wall (32) in the second housing (50) at least partially.

Advantageously, coupling is more efficient with equal simplicity.

Moreover, in case the second coupling portion (5) comprises a third housing (53) comprising in turn the third wall (51) and a fifth wall (54) opposed to the third wall (51), the step of coupling the first element (2) and the second element (4) with respect to each other comprises the steps of injecting glue in the third housing (53) and of introducing the first wall (31) in the third housing (53) at least partially.

Preferably, the step of producing the first element (2) occurs in a first production area, the step of producing the second element (4) occurs in a second production area, and the step of coupling the first element (2) with the second element (4) occurs near or at an area of use of the floating element (1).

Advantageously the floating element (1) can be transported in not assembled form and this reduces the transport costs of the floating element (1).

Preferably, the first production area and the second production area are the same.

The invention claimed is:
1. Floating element for realizing floating structures for supporting photovoltaic panels, comprising:
   a first element which can be obtained by injection moulding, which configures a first coupling portion;
   a second element which can be obtained by injection moulding, which configures a second coupling portion;
   the first element and the second element being mutually configured so that the first coupling portion and the second coupling portion can be seal-coupled with respect to each other so that they define a sealed chamber, when coupled;
   connection means for connecting the floating element to another floating element;
   wherein the connection means comprise:
   a first connection element integral to the second element, the first connection element comprising a first portion developing from the second element and a first tongue developing from the first portion and which comprises a first through hole; and
   a second connection means integral to the first element, the second connection element comprising a second tongue developing from the first element and which comprises a second through hole;

the first tongue and the second tongue being mutually arranged so that, when the first element and the second element are coupled, the first through hole is opposed to the second through hole;

the first element comprising a first groove which is shaped complementarily to the first portion of the first connection element and which is arranged so that, when the first element and the second element are coupled, the first groove receives the first portion to result in form-coupling.

2. Floating element according to claim 1, wherein the second element comprises a second bottom wall and a second side wall which rises from the second bottom wall and wherein the first portion of the first connection element develops transversely with respect to the second bottom wall.

3. Floating element according to claim 1, wherein the first connection element is a unique body with the second element and the second connection element is a unique body with the first element.

4. Floating element according to claim 1, wherein the first coupling portion is arranged at a first peripheral edge of the first element and comprises a first housing comprising in turn a first wall and a second wall opposed with respect to each other; and
   wherein the second coupling portion is arranged at a second peripheral edge of the second element and comprises a third wall;
   the first housing and the third wall being mutually configured so that the first housing can receive the third wall at least partially.

5. Floating element according to claim 4, wherein the second coupling portion comprises a second housing comprising in turn the third wall and a fourth wall opposed to the third wall; the second wall and the second housing being mutually configured so that the second housing can receive the second wall at least partially.

6. Floating element according to claim 5, wherein the second coupling portion comprises a third housing comprising in turn the third wall and a fifth wall opposed to the third wall; the first wall and the third housing being mutually configured so that the third housing can receive the first wall at least partially.

7. Floating element according to claim 1, wherein the first element comprises a first bottom wall and a first side wall raising from the first bottom wall and which comprises the first coupling portion; and
   wherein the first side wall is countersunk to define an angle greater than 90° with the first bottom wall so that it is possible to stack the same first element with a first element of another floating element according to claim 1.

8. Floating element according to claim 1, wherein the second element comprises a second bottom wall and a second side wall raising from the second bottom wall and which comprises the second coupling portion; and
   wherein the second side wall is countersunk to define an angle greater than 90° with the second bottom wall so that it is possible to stack the same second element with a second element of another floating element according to claim 1.

9. Floating structure for supporting photovoltaic panels, comprising:
   a first floating element according to claim 1;
   a second floating element according to claim 1;
   the first floating element and the second floating element being mutually arranged so that the first through hole and the second through hole of the first floating element are opposed to the first through hole and the second through hole of the second floating element;
   a fixing element which is configured to cross the first through hole of the first floating element, the second through hole of the first floating element, the first through hole of the second floating element and the second through hole of the second floating element and to fix the first floating element and the second floating element with respect to each other.

10. Method for producing a floating element according to claim 3, comprising the steps of:
   producing, by means of injection moulding, a first element which configures the first coupling portion and the second connection element;
   producing, by means of injection moulding, the second element which configures a second coupling portion and the first connection element;
   coupling the first element and the second element with respect to each other so that: the first coupling portion and the second coupling portion are seal-coupled and the sealed chamber is formed;
   the first through hole of the first tongue is opposed to the second through hole of the second tongue; and
   the first groove of the first element receives the first portion.

11. Method according to claim 10, wherein the first coupling portion is arranged at a first peripheral edge of the first element and comprises a first housing comprising in turn a first wall and a second wall opposed with respect to each other;
   wherein the second coupling portion is arranged at a second peripheral edge of the second element and comprises a third wall; and
   wherein the step of coupling the first element and the second element with respect to each other comprises the steps of injecting glue in the first housing and of introducing the third wall in the first housing at least partially.

12. Method according to claim 11, wherein the second coupling portion comprises a second housing comprising in turn the third wall and a fourth wall opposed to the third wall; and
   wherein the step of coupling the first element and the second element with respect to each other comprises the steps of injecting glue in the second housing and of introducing the second wall in the second housing at least partially.

13. Method according to claim 12, wherein the second coupling portion comprises a third housing comprising in turn the third wall and a fifth wall opposed to the third wall; and
   wherein the step of coupling the first element and the second element with respect to each other comprises the steps of injecting glue in the third housing and of introducing the first wall in the third housing at least partially.

14. Method according to claim 7, wherein the step of producing the first element occurs in a first production area, wherein the step of producing the second element occurs in a second production area, and wherein the step of coupling the first element with the second element occurs near or at an area of use of the floating element.

\* \* \* \* \*